United States Patent Office 3,573,327
Patented Mar. 30, 1971

3,573,327
3-(LOWER ALKOXY)-7,8,9,10-TETRAHYDRO-6H-DIBENZO-[b,d]PYRAN-6,9-DIONES AND DERIVATIVES THEREOF
Masateru Miyano, Morton Grove, Ill., assignor to G. D. Searle & Co., Chicago, Ill.
No Drawing. Continuation-in-part of application Ser. No. 731,270, May 22, 1968. This application Mar. 23, 1970, Ser. No. 22,036
Int. Cl. C07d 7/26
U.S. Cl. 260—343.2          9 Claims

ABSTRACT OF THE DISCLOSURE

3 - (lower alkoxy) - 7,8,9,10 - tetrahydro - 6H -dibenzo[b,d]pyran-6,9-diones are obtained by cyclization of the corresponding 7-(lower alkoxy)-4-methylcoumarin 3-propionate esters. The latter compounds together with derivatives obtained by reaction at the 9 and/or 10 positions are useful pharmacological agents, e.g. anti-inflammatory and anti-protozoal.

---

This application is a continuation-in-part of my copending application Ser. No. 731,270, filed May 22, 1968.

The present invention relates to novel tricyclic chemical compounds characterized by the 6H - dibenzo[b,d] pyran ring structure and, specifically, with 3 - (lower alkoxy) - 7,8,9,10 - tetrahydro - 6H-dibenzo[b,d]pyran-6,9-diones and derivatives thereof represented by the following structural formula.

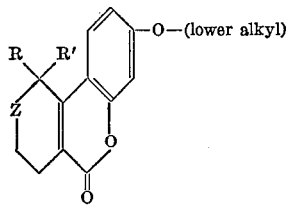

wherein R and R′ can be either hydrogen or a lower alkyl radical and Z is a carbonyl, hydroxymethylene, di-(lower alkoxy)methylene or (lower alkylene)dioxymethylene radical.

The lower alkyl radicals symbolized in the foregoing structural representation are typified by methyl, ethyl, propyl, butyl, pentyl, hexyl, heptyl and the branched chain isomers thereof.

The lower alkoxy radicals are exemplified by methoxy, ethoxy, propoxy, butoxy, pentyloxy, hexyloxy, heptyloxy and the branched chain radicals isomeric therewith.

Representative of the lower alkylene radicals encompassed by that structural formula are ethylene, trimethylene, tetramethylene, pentamethylene and the branched chain isomers thereof.

The compounds of this invention are conveniently manufactured by processes which utilize 7 - alkoxy - 4-methylcoumarin 3-propionate esters as the starting materials. Those materials are represented by the following structural formula

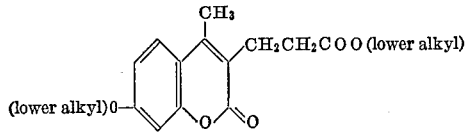

are alternatively obtained by alkylation of the corresponding 7-hydroxy compound or by condensation of the appropriate resorcinol alkyl ether with a dialkyl α-acetoglutarate. The reaction of ethyl 7 - hydroxy - 4-methylcourmarin 3 - propionate with methyl iodide and potassium carbonate in acetone and the reaction of resorcinol monoethyl ether with diethyl α-acetoglutarate are thus alternate methods for the manufacture of ethyl 7-methoxy-4-methylcoumarin 3-propionate.

Cyclization of the aforementioned 7-alkoxy-4-methylcoumarin 3-pripionate esters results in the corresponding instant 3 - (lower alkoxy) - 7,8,9,10 - tetrahydro - 6H-dibenzo[b,d]pyran - 6,9 - diones of the following structural formula

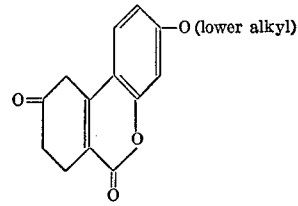

Typically, ethyl 7-methoxy - 4 - methylcoumarin 3-propionate is contacted with sodium hydride in dimethyl sulfoxide to effect cyclization, thus affording 3-methoxy-7,8,9,10 - tetrahydro - 6H - dibenzo[b,d]pyran - 6,9-dione.

Alkylation of the instant 3-(lower alkoxy)-7,8,9,10-tetrahydro - 6H - dibenzo[b,d]pyran - 6,9 - diones, typically with a lower alkyl iodide in the presence of a suitable acid acceptor results in the instant 10-alkyl and 10,10-dialkyl derivatives. 3 - methoxy - 7,8,9,10 - tetrahydro - 6H - dibenzo[b,d]pyran - 6,9-dione thus is contacted with methyl iodide and potassium tertiary-butoxide to afford 3-methoxy - 10 - methyl - 7,8,9,10 - tetrahydro-6H-dibenzo[b,d]pyran - 6,9 - dione, which is, in turn, contacted with those same reagents to produce 3-methoxy - 10,10 - dimethyl - 7,8,9,10 - tetrahydro - 6H-dibenzo[b,d]pyran-6,9-dione.

Catalytic hydrogenation of the instant 9-ones results in the corresponding 9-hydroxy substances. 3-methoxy-7,8,9,10 - tetrahydro - 6H - dibenzo[b,d]pyran - 6,9-dione is thus converted to 9-hydroxy-3-methoxy-7,8,9,10-tetrahydro-6H-dibenzo[b,d]pyran-6-one by reaction with hydrogen in the presence of a 5% palladium-on-carbon catalyst. That conversion is effected also by the use of sodium borohydride as the reducing agent.

The instant ketals are produced by reaction of the parent ketones with the appropriate alcohol or glycol, preferably in the presence of a suitable acid catalyst. 3-methoxy - 7,8,9,10 - tetrahydro - 6H - debenzo[b,d] pyran - 6,9 - dione is thus heated in benzene solution with ethylene glycol and a catalytic quantity of p-toluenesulfonic acid to produce 3-methoxy-7,8,9,10-tetrahydro-6H-dibenzo[b,d]pyran-6,9-dione 9-ethylene ketal.

The compounds of this invention display valuable pharmacological properties. They are, for example, anti-inflammatory agents. They possess, in addition, anti-protozoal activity as is evidenced by their ability to inhibit the growth of organisms such as Tetrahymena gelleii.

The assay used to determine the anti-inflammatory activity of the instant compounds is described as follows:

Each of a group of 10 intact male rats weighing 100–130 grams is injected under the plantar surface of each hind foot with 0.1 ml. of a 1% solution of carrageenin (Type 402, Marine Colloids, Inc.). The test compound, dissolved or suspended in saline, corn oil or propylene glycol, is administered subcutaneously one hour prior to the carrageenin injection. Another such group serving as controls is treated in the identical manner save for omission of the test compound. The edema resulting from carrageenin injection is determined by measuring the circumference of the hind feet, in arbitrary units, five hours after the carrageenin injection and subtracting the average swelling of the group treated with the test compound from the average swelling of the control group. Compounds are rated active if they produce a significant decrease (P<0.05) in the swelling observed in control animals.

The anti-protozoal activity of the compounds of this invention was detected by use of the following assay:

A sterile nutrient medium composed of 12 grams of proteose peptone, 8 grams of sucrose and 1000 ml. of distilled water is inoculated with a viable axenic culture of *Tetrahymena gelleii*, then is incubated at room temperature for 24 hours. At the end of that time a 0.5 ml. quanity is transferred aspectically to a test tube containing approximately 5 mg. of the test compound. A test tube containing the culture alone serves as a control. The tubes are incubated at room temperature for 24 hours, then are examined microscopically in order to determine the degree of growth of the microorganism. A compound is considered active if it results in a definite inhibition of growth as compared to the control.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples temperatures are given in degrees centigrade (° C.) and quantities of materials in parts by weight unless otherwise noted.

EXAMPLE 1

Method A

To a solution of 300.5 parts of ethyl 7-hydroxy-4-methylcoumarin 3-propionate and 425 parts of methyl iodide in 800 parts of acetone is added 240 parts of potassium carbonate and the resulting reaction mixture is heated with stirring at the reflux temperature for about 3½ hours. At the end of that time 280 parts of potassium carbonate and 240 parts of methyl iodide are added and heating at the reflux temperature is continued for an additional four hours. The reaction mixture is then filtered; the filter cake is washed with acetone and the combined filtrate and washings are concentrated to dryness, then dissolved in ether. The ether solution is washed successively with dilute aqueous sodium hydroxide and water, then dried over anhydrous potassium carbonate and partially concentrated in order to induce crystallization. Ethyl 7-methoxy-4-methylcoumarin 3-propionate crystallizes as colorless needles, melting at about 74–75.5°, displaying infrared absorption maxima at about 5.83 and 6.21 microns and also an ultraviolet absorption maximum at about 322 millimicrons with a molecular extinction coefficient of about 17,820.

Method B

A solution containing 3.7 parts of resorcinol monomethyl ether, 6.9 parts of diethyl α-acetoglutarate and 4.2 parts of boron trifluoride etherate in 35 parts of benzene is heated at the reflux temperature for about nine hours, during which time the water formed is continuously separated. The reaction mixture is then cooled, poured into aqueous sodium bicarbonate, stirred for approximately two hours and extracted with benzene. The benzene solution is washed successively with dilute aqueous potassium hydroxide and water, then dried over anhydrous sodium sulfate and concentrated to dryness under reduced pressure. Distillation of the resulting residue at 0.5 mm. affords ethyl 7-methoxy-4-methylcoumarin 3-propionate, boiling at 205–210° and identical with the product of Method A.

EXAMPLE 2

To a solution of 100 parts of ethyl 7-methoxy-4-methylcoumarin 3-propionate in 400 parts by volume of dimethyl sulfoxide is added 15 parts of a 56% sodium hydride mull in mineral oil and the resulting mixture is stirred at room temperature for about two hours. The resulting dark brown reaction mixture is neutralized by the addition of approximately 25 parts of acetic acid, then is diluted with approximately 500 parts of water. The crystals which form are collected by filtration, washed on the filter first with water then with ether in order to afford the crude product, melting at about 222–224°. Recrystallization of that material from dioxane affords pure 3-methoxy-7,8,9,10-tetrahydro-6H-dibenzo[b,d]pyran - 6,9-dione, melting at about 228.5°. It exhibits infrared absorption maxima at about 5.81 and 6.17 microns, an ultraviolet absorption maximum at about 319 millimicrons with a molecular extinction coefficient of about 16,240 and is represented by the following structural formula

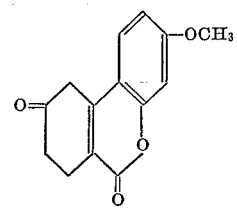

EXAMPLE 3

To a solution of 26. parts of -methoxy-7,8-39,10-tetrahydro-6H-dibenzo[b,d]pyran-6,9-dione and 13.5 parts of potassium tertiary-butoxide in 250 parts by volume of dimethyl sulfoxide is added successively 48 parts of tertiary-butyl alcohol and 228 parts of methyl iodide. The resulting reaction mixture is heated at the reflux temperature for about 15 minutes, then is stripped of excess methyl iodide by distillation under reduced pressure and poured into approximately 500 parts of ice water. The resulting mixture is stored at 0–5° for about 16 hours, then is filtered in order to remove unreacted starting material. The acetone filtrate is partially concentrated, then is diluted with methanol, resulting in crystallization of the crude product as pale yellow crystals. Recrystallization of that material from methanol affords pure 3-methoxy-10-methyl-7,8,9,10-tetrahydro - 6H - dibenzo[b,d]pyran-6,9-dione, melting at about 135°. This compound exhibits infrared absorption maxima at about 5.82 and 6.19 microns and an ultraviolet absorption maximum at about 322 millimicrons with a molecular extinction coefficient of about 15,000. This compound is represented by the following structural formula

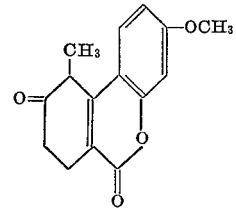

From the methanol mother liquors, there is obtained after recrystallization from acetone, 3-methoxy-10-methyl-7,8,9,10-tetrahydro-6H-dibenzo[b,d]pyran-6,9-dione 9-dimethyl ketal, melting at about 159°.

EXAMPLE 4

To a solution of 5.2 parts of 3-methoxy-10-methyl-7,8,9,10-tetrahydro-6H-dibenzo[b,d]pyran-6,9-dione in 70 parts by volume of dimethyl sulfoxide is added 2.4 parts of potassium tertiary-butoxide and that mixture is stirred for about 15 minutes in order to effect solution. At the end of that time, 12 parts of tertiary-butyl alcohol and 45.6 parts of methyl iodide are added and that reaction mixture is stirred at room temperature for about 30 minutes, then is heated at the reflux temperature for about 20 minutes. The reaction mixture is then cooled and poured into ice water and the resulting aqueous mixture is extracted with ether. The ether extract is washed successively with dilute aqueous potassium hydroxide and water, then dried over anhydrous potassium carbonate and concentrated to dryness under reduced pressure. The resulting crystalline residue is purified by recrystallization from chloroformether to afford pale yellow needle-like crystals of 3-methoxy-10,10-dimethyl-7,8,9,10-tetrahydro-6H-dibenzo[b,d]pyran-6,9-dione, melting at about 186.5–188°. This compound exhibits infrared absorption maxima at about 5.80, 6.14 and 6.21 microns and an ultraviolet absorption maximum at about 321 millimicrons with a molecular extinction coefficient of about 15,000. It is represented by the following structural formula

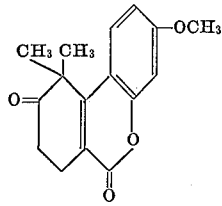

EXAMPLE 5

A mixture containing 6 parts of 3-methoxy-7,8,9,10-tetrahydro-6H-dibenzo[b,d]pyran-6,9-dione, 1.2 parts of 5% palladium-on-carbon catalyst and 262.5 parts of warm acetic acid is shaken with hydrogen at an initial pressure of 50 pounds per square inch for about 46 hours. The catalyst is removed by filtration and washed on the filter with acetone. The combined filtrate and washings are concentrated to dryness and the resulting residue is recrystallized from acetone to afford crystals of the crude product. Recrystallization from dioxane affords pure 3-methoxy-9-hydroxy-6H-dibenzo[b,d]pyran-6-one, melting at about 274°.

The mother liquor from the latter recrystallization is partially concentrated and the crystalline material which separates is further purified by recrystallization from dioxane, thus yielding 3-methoxy-9-hydroxy-7,8,9,10-tetrahydro-6H-dibenzo[b,d]pyran-6-one, melting at about 182°. This compound is represented by the following structural formula

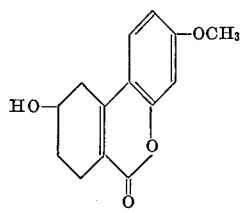

EXAMPLE 6

A suspension containing 20 parts of 3-methoxy-7,8,9,10-tetrahydro-6H-dibenzo[b,d]pyran-6,9-dione, 5 parts of sodium borohydride and 320 parts of ethanol is stirred at room temperature for about 3 hours. The crystals which form are separated by filtration, washed on the filter first with water, then with ethanol and finally purified by recrystallization from dioxane, thus producing 3-methoxy-9-hydroxy-7,8,9,10-tetrahydro-6H-dibenzo[b,d]pyran-6-one, identical with the product of Example 5.

EXAMPLE 7

A suspension containing 150 parts of 3-methoxy-7,8,9,10-tetrahydro-6H-dibenzo[b,d]pyran-6,9-dione, 255.3 parts of ethylene glycol, 1 part of p-toluenesulfonic acid and 1320 parts of benzene is heated at the reflux temperature for about 8 hours, during which time the water formed is continuously removed. The reaction mixture is then cooled, washed with aqueous potassium carbonate, dried over anhydrous sodium sulfate and partially concentrated to induce crystallization. The resulting crystals are collected by filtration and dried to afford 3-methoxy-7,8,9,10-tetrahydro-6H-dibenzo[b,d]pyran-6,9-dione 9-ethylene ketal, melting at about 145.5°. This compound exhibits infrared absorption spectral peaks at about 5.82 and 6.19 microns and an ultraviolet absorption maximum at about 319 millimicrons with a molecular extinction coefficient of about 17,300. This compound is represented by the following structural formula

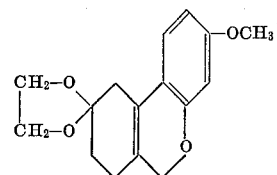

EXAMPLE 8

A suspension containing 18 parts of 3-methoxy-10,10-dimethyl - 7,8,9,10 - tetrahydro - 6H - dibenzo[b,d]-pyran-6,9-dione, 55.5 parts of ethylene glycol, 0.5 part of p-toluenesulfonic acid and 440 parts of benzene is heated at the reflux temperature for about 48 hours, during which time the water of reaction is continuously removed. The reaction mixture is then cooled, washed with aqueous potassium carbonate, dried over anhydrous sodium sulfate and partially concentrated. The crystals which form are collected by filtration and dried to afford 3-methoxy-10,10-dimethyl-7,8,9,10-tetrahydro - 6H - dibenzo[b,d]pyran-6,9-dione 9-ethylene ketal, melting at about 179–180°. Infrared absorption maxima are observed at about 5.79 and 6.14 microns. This compound displays also an ultraviolet absorption maximum at about 319 millimicrons with a molecular extinction coefficient of about 14,600. It is represented by the following structural formula

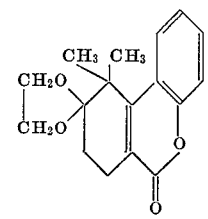

What is claimed is:
1. A compound of the formula

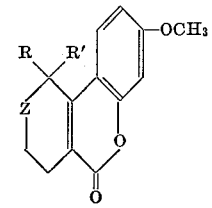

wherein R and R' are selected from the group consisting of hydrogen and a methyl radical and Z is selected from the group consisting of carbonyl, hydroxymethylene, dimethoxymethylene and ethylenedioxymethylene radicals.
2. As in claim 1, a compound of the formula

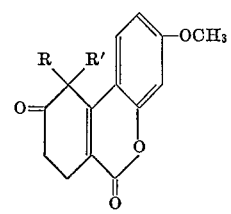

wherein R and R' are members of the class consisting of hydrogen and a methyl radical.
3. As in claim 1, the compound which is 3-methoxy-7,8,9,10-tetrahydro-6H-dibenzo[b,d]pyran-6,9-dione.

4. As in claim 1, the compound which is 3-methoxy-10-methyl-7,8,9,10-tetrahydro-6H - dibenzo[b,d] pyran-6,9-dione.

5. As in claim 1, the compound which is 3-methoxy-10,10-dimethyl-7,8,9,10-tetrahydro - 6H - dibenzo[b,d]-pyran-6,9-dione.

6. As in claim 1, the compound which is 9-hydroxy-3-methoxy - 7,8,9,10 - tetrahydro - 6H - dibenzo[b,d]pyran-6-one.

7. As in claim 1, the compound which is 3-methoxy-10-methyl - 7,8,9,10 - tetrahydro - 6H-dibenzo[b,d]pyran-6,9-dione 9-dimethyl ketal.

8. As in claim 1, the compound which is 3-methoxy-10,10-dimethyl-7,8,9,10-tetrahydro - 6H - dibenzo[b,d]-pyran-6,9-dione 9-ethylene ketal.

9. As in claim 1, the compound which is 3-methoxy-7,8,9,10-tetrahydro-6H-dibenzo[b,d]pyran-6,9 - dione 9-ethylene ketal.

References Cited
UNITED STATES PATENTS

| | | | |
|---|---|---|---|
| 2,647,132 | 7/1953 | Long et al. | 260—343.2 |
| 2,665,281 | 1/1954 | Seidman et al. | 260—343.2 |

JOHN M. FORD, Primary Examiner

U.S. Cl. X.R.

260—343.2; 424—283